US012562595B2

(12) United States Patent
Hisano et al.

(10) Patent No.: US 12,562,595 B2
(45) Date of Patent: Feb. 24, 2026

(54) POWER SUPPLY DEVICE

(71) Applicant: Daifuku Co., Ltd., Osaka (JP)

(72) Inventors: Takeshi Hisano, Hinocho (JP); Akira Murota, Hinocho (JP); Masaaki Yamamoto, Hinocho (JP); Hiroshi Kamiyoshi, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 593 days.

(21) Appl. No.: 18/116,568

(22) Filed: Mar. 2, 2023

(65) Prior Publication Data

US 2023/0283109 A1 Sep. 7, 2023

(30) Foreign Application Priority Data

Mar. 3, 2022 (JP) ................................. 2022-032435

(51) Int. Cl.
H02J 50/05 (2016.01)
B60L 5/00 (2006.01)
H02J 50/12 (2016.01)

(52) U.S. Cl.
CPC .............. H02J 50/05 (2016.02); B60L 5/005 (2013.01); H02J 50/12 (2016.02)

(58) Field of Classification Search
CPC ........ H02J 50/05; H02J 50/12; H02J 2310/48; B60L 5/005; B60B 13/00

USPC .......................................... 104/134; 320/108
See application file for complete search history.

(56) References Cited

U.S. PATENT DOCUMENTS

2020/0412179 A1* 12/2020 Yoon ........................ H02J 50/80
2025/0105671 A1* 3/2025 Takahashi ............. H02J 50/005

FOREIGN PATENT DOCUMENTS

JP 11155245 A 6/1999

* cited by examiner

*Primary Examiner* — Laura K Tso
(74) *Attorney, Agent, or Firm* — The Webb Law Firm

(57) ABSTRACT

A power supply device includes a power supply unit that outputs alternating current, an output unit connectable to a power supply line, and an adjusting unit that adjusts the capacitance of a power supply circuit between the power supply unit and the output unit. The adjusting unit includes a first capacitor, a second capacitor, and a circuit switching mechanism. The circuit switching mechanism can switch between a series connection state in which the first capacitor and the second capacitor are connected in series between the power supply unit and the output unit, and a parallel connection state in which the first capacitor and the second capacitor are connected in parallel between the power supply unit and the output unit.

7 Claims, 4 Drawing Sheets

POWER SUPPLY DEVICE

CROSS-REFERENCE TO RELATED APPLICATION

This application claims priority to Japanese Patent Application No. 2022-032435 filed Mar. 3, 2022, the disclosure of which is hereby incorporated by reference in its entirety.

BACKGROUND OF THE INVENTION

1. Field of the Invention

The present invention relates to a power supply device that is for use in a contactless power supply facility, is connected to a power supply line extending along a movement path of a moving body provided with a power receiving device, and supplies power to the power receiving device in a contactless manner by supplying alternating current to the power supply line.

2. Description of the Related Art

An example of a power supply device for use in a contactless power supply facility is disclosed in JP H11-155245 (Patent Document 1). The reference numerals used in Patent Document 1 are shown in parentheses in the following description of the related art. The power supply device shown in FIG. 7 of Patent Document 1 includes a power supply circuit (1) that outputs alternating current, an output unit connected to a primary power supply line (9), and a capacitor adjustment circuit (7) that adjusts the capacitance (capacitor value) of the power supply circuit between the power supply circuit (1) and the output unit. The capacitor adjustment circuit (7) adjusts the capacitance of the power supply circuit such that the difference between the oscillation frequency of the power supply circuit (1) and the resonance frequencies of resonance circuits provided in power receiving devices (10a to 10n) is within a predetermined range. In the embodiment shown in FIG. 9 of Patent Document 1, the capacitor adjustment circuit (7) includes a plurality of capacitors (condensers) arranged in parallel and switches connected in series with the capacitors, and the capacitance of the power supply circuit is adjusted by controlling the on and off states of the switches.

The length of the power supply line (the primary power supply line in Patent Document 1) may be different for each contactless power supply facility. Also, the inductance of the power supply line decreases as the length of the power supply line decreases, and increases as the length of the power supply line increases. For this reason, in order to keep the impedance (specifically, the reactance) of the overall path (including the power supply circuit and the power supply line) constant, it is necessary to increase the capacitance of the power supply circuit as the length of the power supply line decreases, and to reduce the capacitance of the power supply circuit as the length of the power supply line increases. For example, in the embodiment shown in FIG. 9 of Patent Document 1, the capacitance of the power supply circuit can be increased by increasing the number of switches that are turned on and increasing the number of circuit can be reduced by reducing the number of switches that are turned on and reducing the number of capacitors that are connected in parallel.

In this way, in the embodiment shown in FIG. 9 of Patent Document 1, if the power supply line is long, the capacitance of the power supply circuit can be reduced by reducing the number of capacitors that are connected in parallel, but as the capacitance decreases, the voltage across the terminals of the capacitors increases, and higher withstand voltage performance is required for the capacitors. In particular, if the capacitors connected in parallel are constituted by the same component, all of the capacitors need to be capacitors that have high withstand voltage performance. For this reason, in the embodiment shown in FIG. 9 of Patent Document 1, the capacitance of the power supply circuit can be adjusted in accordance with the length of the power supply line, but the withstand voltage performance required for the capacitors tends to be high, and the cost tends to increase.

SUMMARY OF THE INVENTION

In view of the foregoing, there is desire to realize a power supply device that enables appropriately adjusting the capacitance of the power supply circuit in accordance with the length of the power supply line, while also achieving a reduction in cost.

A power supply device according to an aspect of the present disclosure is a power supply device for use in a contactless power supply facility, the power supply device being connectable to a power supply line extending along a movement path of a moving body provided with a power receiving device, and being configured to supply power to the power receiving device in a contactless manner by supplying alternating current to the power supply line, the power supply device including: a power supply unit configured to output alternating current; an output unit configured to be connected to the power supply line; and an adjusting unit configured to adjust a capacitance of a power supply circuit between the power supply unit and the output unit, wherein the adjusting unit includes a first capacitor, a second capacitor, and a circuit switching mechanism, and the circuit switching mechanism is switchable between a series connection state, in which the first capacitor and the second capacitor are connected in series between the power supply unit and the output unit, and a parallel connection state, in which the first capacitor and the second capacitor are connected in parallel between the power supply unit and the output unit.

According to this configuration, in the case where the power supply line is relatively long, by causing the circuit switching mechanism to switch to the series connection state, it is possible to reduce the combined capacitance of the first capacitor and the second capacitor, thus reducing the capacitance of the power supply circuit. On the other hand, in the case where the power supply line is relatively short, by causing the circuit switching mechanism to switch to the parallel connection state, it is possible to increase the combined capacitance of the first capacitor and the second capacitor, thus increasing the capacitance of the power supply circuit.

Thus, according to the above configuration, it is possible to appropriately adjust the capacitance of the power supply circuit in accordance with the length of the power supply line. Moreover, according to the above configuration, in the case where the power supply line is relatively long, the circuit switching mechanism can be switched to the series connection state, thus making it possible for the terminal voltage, which increases due to a decrease in the capacitance of the power supply circuit, to be shared between the first capacitor and the second capacitor. Accordingly, compared to the case where the terminal voltage is not shared, it is possible to reduce the withstand voltage performance required for the first capacitor and the second capacitor and achieve a reduction in cost.

Thus, according to this configuration, it is possible to appropriately adjust the capacitance of the power supply circuit in accordance with the length of the power supply line, while also achieving a reduction in cost.

Further features and advantages of the power supply device will become clear from the following description of the embodiments given with reference to the drawings.

DESCRIPTION OF THE INVENTION

First Embodiment

A first embodiment of a power supply device will be described below with reference to the drawings.

Figure 1:
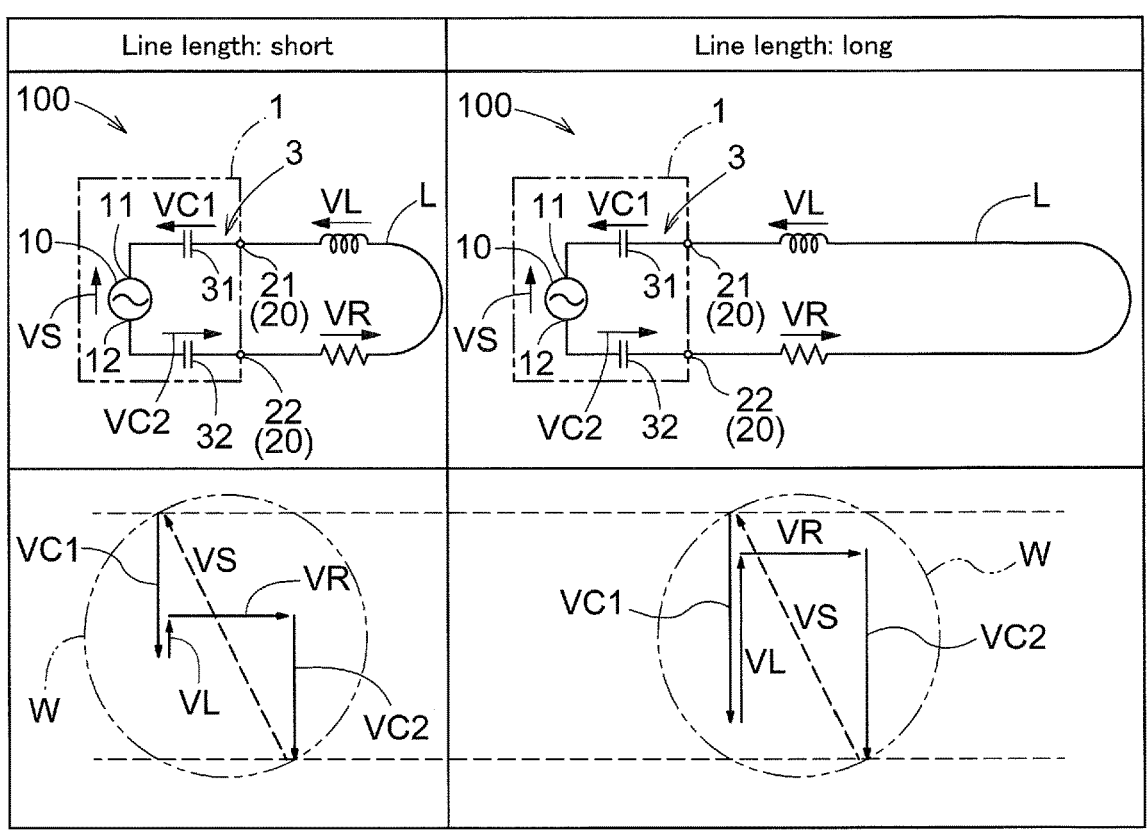
FIG. 1 includes an equivalent circuit diagram and a voltage vector diagram of a contactless power supply facility according to a first embodiment.

A power supply device 1 (power supply device 1 for use in contactless power supply facility 100) is a device used as an electric power supply source in a contactless power supply facility 100. As shown in FIG. 1, the power supply device 1 is connected to power supply lines L. The power supply lines L extend along a movement path P (see FIG. 2) of a moving body 90 that includes a power receiving device 91. The power supply device 1 supplies power to the power receiving device 91 in a contactless manner by supplying alternating current to the power supply lines L. In this way, the contactless power supply facility 100 is a facility that supplies electric power to the power receiving device 91 in a contactless manner by supplying alternating current to the power supply lines L.

At least some of the operations of the moving body 90 (e.g., movement along the movement path P) is performed using power received by the power receiving device 91. Specifically, power received by the power receiving device 91 is supplied to an actuator for operating the moving body 90 (e.g., a later-described drive motor 96). The power receiving device 91 includes a pickup coil, for example. Alternating current power is induced in the pickup coil by a magnetic field generated around the power supply lines L that are receiving alternating current. This alternating current power is converted into direct current power, for example, and supplied to an actuator for operating the moving body 90.

Figure 2:
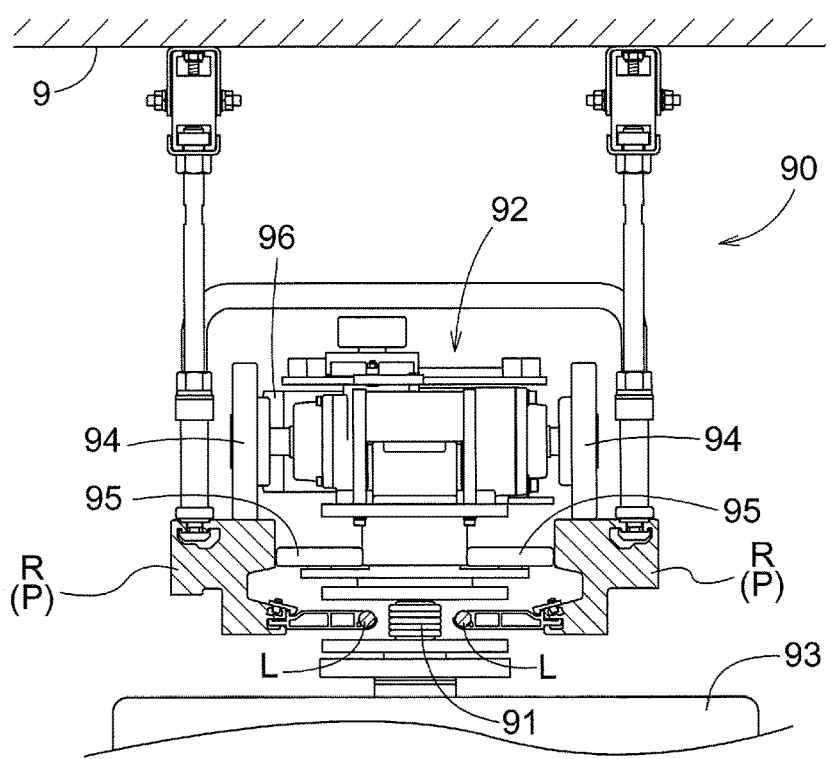
FIG. 2 is a front view of part of a moving body according to the first embodiment.

The moving body 90 is an article transport vehicle that travels along the movement path P and transports an article, for example. The article is a FOUP (Front Opening Unified Pod) that contains semiconductor wafers, for example. FIG. 2 shows an example of the moving body 90 used as an article transport vehicle. As shown in FIG. 2, the moving body 90 includes a travel section 92 that travels along the movement path P. The moving body 90 further includes a main body section 93 coupled to the travel section 92, and the article is transport by the moving body 90 while being accommodated in the main body section 93. The movement path P is formed using rails R (here, a pair of rails R spaced apart in the path width direction). The path width direction (left-right direction in FIG. 2) is a direction orthogonal to both the longitudinal direction of the movement path P and the up-down direction (vertical direction). In the example shown in FIG. 2, the rails R are suspended from a ceiling 9, and the movement path P is formed along the ceiling 9.

As shown in FIG. 2, the travel section 92 includes travel wheels 94 that roll on travel surfaces (here, upper surfaces) of the rails R, and a drive motor 96 that rotates the travel wheels 94. The drive motor 96 is supplied with power received by the power receiving device 91, and rotates the travel wheels 94. Due to the travel wheels 94 being rotated by the drive motor 96, the travel section 92 travels along the movement path P. As shown in FIG. 2, the travel section 92 includes guide wheels 95 that roll on guide surfaces (here, side surfaces that face each other in the path width direction) of the rails R, and the travel section 92 travels along the rails R while being guided by the guide wheels 95 coming into contact with the guide surfaces of the rails R.

As described above, the power supply lines L for supplying power to the power receiving device 91 in a contactless manner are arranged along the movement path P. In the example shown in FIG. 2, the power supply lines L extend along the rails R that form the movement path P. Also, in the example shown in FIG. 2, the power supply lines L are arranged on opposite sides of the power receiving device 91 in the path width direction.

Next, the power supply device 1 that supplies alternating current to the power supply lines L will be described. As shown in the equivalent circuit diagram in FIG. 1, the power supply device 1 includes a power supply unit 10 that outputs alternating current, an output unit 20 connected to the power supply lines L, and a first adjusting unit 31 that adjusts the capacitance of a power supply circuit 3 between the power supply unit 10 and the output unit 20. In the present embodiment, the power supply device 1 further includes a second adjusting unit 32. In the present embodiment, the capacitance of the power supply circuit 3 is adjusted by the first adjusting unit 31 and the second adjusting unit 32. In the present embodiment, the first adjusting unit 31 corresponds to the "adjusting unit".

The power supply unit 10 outputs alternating current with a frequency the same as or close to a frequency that achieves a series resonance state between the capacitance of the adjusting units (in the present embodiment, the first adjusting unit 31 and the second adjusting unit 32) and the inductance of the power supply lines L. Although this will not be described in detail, the configuration of the power supply circuit of the power supply unit 10 is centered around a switching power supply circuit that includes an inverter circuit. The power supply unit 10 causes the power supply circuit to output alternating current by pulse width modulation (PWM), for example.

As shown in the equivalent circuit diagram of FIG. 1, the power supply unit 10 includes a first power supply electrode 11 and a second power supply electrode 12 as a pair of electrodes, and the output unit 20 includes a first output terminal 21 and a second output terminal 22 as a pair of output terminals. The first adjusting unit 31 is connected between the first power supply electrode 11 and the first output terminal 21, and the second adjusting unit 32 is connected between the second power supply electrode 12 and the second output terminal 22. First ends of the power supply lines L are connected to the first output terminal 21 and second ends of the power supply lines L are connected to the second output terminal 22. Accordingly, the first power supply electrode 11 is connected to first ends of the power supply lines L via the first adjusting unit 31, and the second power supply electrode 12 is connected to the second ends of the power supply lines L via the second adjusting unit 32.

The adjusting units (in the present embodiment, the first adjusting unit 31 and the second adjusting unit 32) are connected in series with the power supply lines L so as to form a resonance circuit together with the power supply lines L. The capacitance of the adjusting units is adjusted so as to resonate at a frequency the same as or close to the frequency of the alternating current output by the power supply unit 10. In the present embodiment, the first adjusting unit 31 and the second adjusting unit 32 are separately connected to the two electrodes of the power supply unit 10. Accordingly, the potential difference (maximum potential difference, maximum voltage) in the path that includes the power supply circuit 3 and the power supply lines L can be kept smaller than in the case where both the first adjusting unit 31 and the second adjusting unit 32 are connected to one electrode of the power supply unit 10. More specifically, inscribed circles W shown in the lower part of FIG. 1 are circles inscribed by a group of vectors forming a voltage vector diagram (described in detail later), and the diameter of the inscribed circles W corresponds to the aforementioned potential difference. In the present embodiment, the first adjusting unit 31 and the second adjusting unit 32 are separately connected to the two electrodes of the power supply unit 10, and therefore the diameter of the inscribed circles W, that is to say the potential difference, can be kept smaller than in the case where both the first adjusting unit 31 and the second adjusting unit 32 are connected to one electrode of the power supply unit 10.

In the voltage vector diagrams shown in the lower part of FIG. 1, VS is the voltage of the power supply unit 10 (the voltage between the first power supply electrode 11 and the second power supply electrode 12), VC1 is the voltage across the terminals of the first adjusting unit 31, VC2 is the voltage across the terminals of the second adjusting unit 32, VL is the voltage caused by the inductance (inductance component) of the power supply lines L, and VR is the voltage caused by the resistance (resistance component) of the power supply lines L. The impedance (combined impedance) of the entire path, including the power supply circuit 3 and the power supply lines L, is represented by the vector sum of these four voltages (VC1, VL, VR, and VC2). Note that the voltage vector diagrams shown in FIG. 1 do not necessarily accurately represent actual magnitudes (magnitudes of real number components, magnitudes of imaginary number components).

In FIG. 1, in order to compare two cases with different line lengths (lengths of power supply lines L), an equivalent circuit diagram and a voltage vector diagram for the case of a short line length are shown on the left side, and an equivalent circuit diagram and a voltage vector diagram for the case of a long line length are shown on the right side. In FIG. 1, the voltage vector diagrams for two different line lengths are shown such that the impedance (specifically, reactance) of the entire path, including the power supply circuit 3 and the power supply lines L, is the same for the two.

As the line length becomes shorter, the inductance of the power supply lines L becomes smaller, and accordingly the voltage caused by the inductance of the power supply lines L (VL) decreases. Also, as the line length becomes longer, the inductance of the power supply lines L becomes larger, and accordingly the voltage caused by the inductance of the power supply lines L (VL) increases. For this reason, in order to keep the impedance (specifically, the reactance) of the entire path (including the power supply circuit 3 and the power supply lines L) constant, as shown in FIG. 1, it is necessary to lower the magnitude of the vector sum of the two voltages (VC1, VC2) (i.e., to raise the capacitance of the power supply circuit 3) as the length of the power supply lines L becomes shorter, and to raise the magnitude of the vector sum of the two voltages (VC1, VC2) (i.e., to lower the capacitance of the power supply circuit 3) as the length of the power supply lines L becomes longer. Due to having the configuration described below, the power supply device 1 of the present embodiment makes it possible to appropriately adjust the capacitance of the power supply circuit 3 in accordance with the length of the power supply lines L, while also achieving a reduction in cost.

Figures 3, 4:
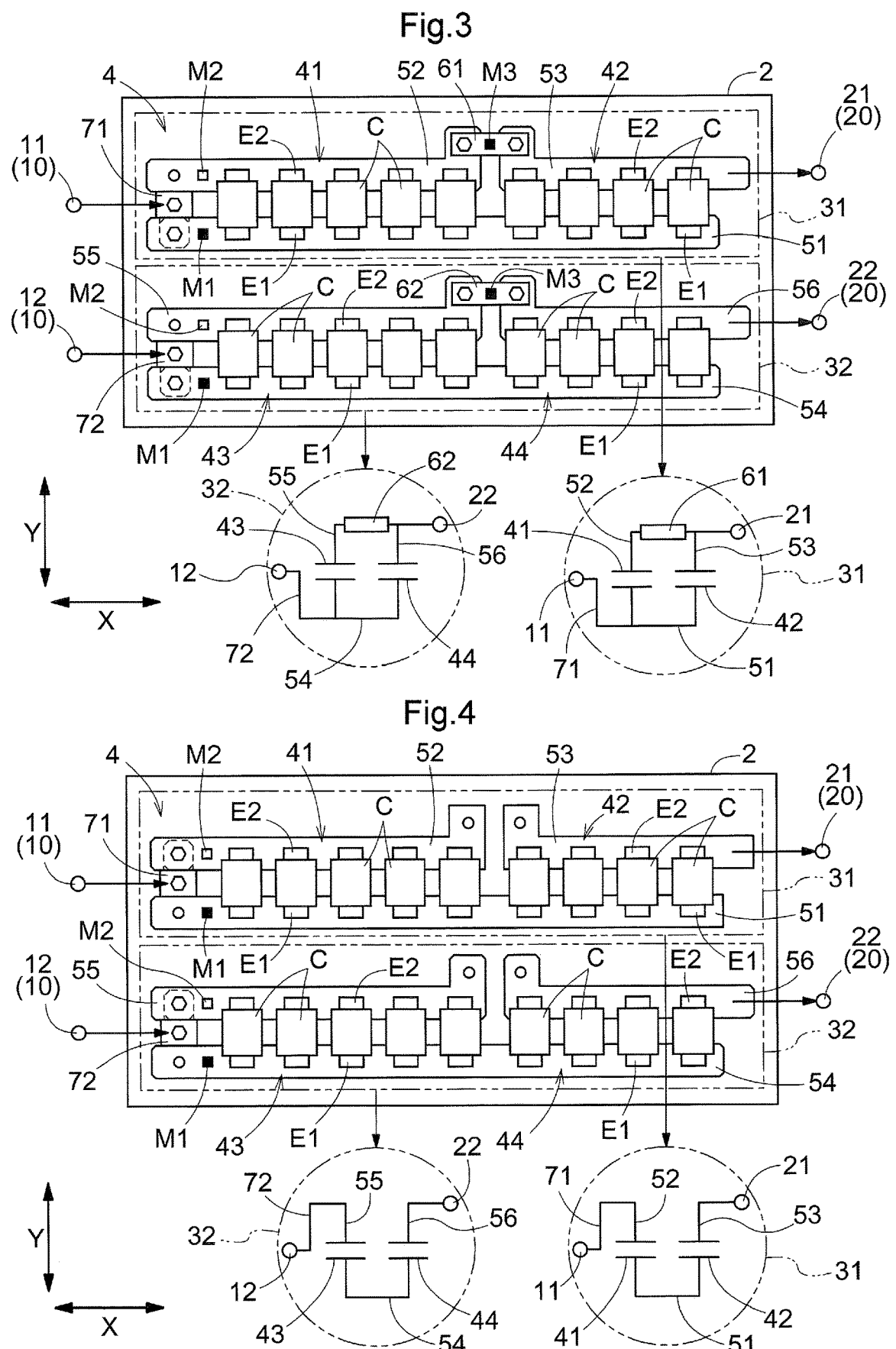
FIG. 3 is a plan view of a first adjusting unit and a second adjusting unit according to the first embodiment.
FIG. 4 is a plan view of the first adjusting unit and the second adjusting unit according to the first embodiment.

As shown in FIGS. 3 and 4, the first adjusting unit 31 includes a first capacitor 41, a second capacitor 42, and a circuit switching mechanism 4. Although described in more detail later, the circuit switching mechanism 4 is configured to switch between a series connection state (the state shown in FIG. 4) in which the first capacitor 41 and the second capacitor 42 are connected in series between the power supply unit 10 and the output unit 20 (in the present embodiment, between the first power supply electrode 11 and the first output terminal 21), and a parallel connection state (the state shown in FIG. 3) in which the first capacitor 41 and the second capacitor 42 are connected in parallel between the power supply unit 10 and the output unit 20 (in the present embodiment, between the first power supply electrode 11 and the first output terminal 21). The capacitance of the first capacitor 41 may be the same as or different from the capacitance of the second capacitor 42.

The second adjusting unit 32 includes a third capacitor 43 and a fourth capacitor 44. The same circuit switching mechanism 4 is used with both the second adjusting unit 32 and the first adjusting unit 31. Although described in more detail later, the circuit switching mechanism 4 is configured to switch between a series connection state (the state shown in FIG. 4) in which the third capacitor 43 and the fourth capacitor 44 are connected in series between the power supply unit 10 and the output unit 20 (in the present embodiment, between the second power supply electrode 12 and the second output terminal 22), and a parallel connection state (the state shown in FIG. 3) in which the third capacitor 43 and the fourth capacitor 44 are connected in parallel between the power supply unit 10 and the output unit 20 (in the present embodiment, between the second power supply electrode 12 and the second output terminal 22). The capacitance of the third capacitor 43 may be the same as or different from the capacitance of the fourth capacitor 44.

The first capacitor 41, the second capacitor 42, the third capacitor 43, and the fourth capacitor 44 each include one or more capacitor elements C (condenser elements). In the example shown in FIGS. 3 and 4, these capacitors (41 to 44) each include a plurality of capacitor elements C connected in parallel to each other. The capacitor elements C may include capacitor elements C that have different capacitances from each other. Note that FIGS. 3 and 4 (as well as FIGS. 7 and 8 that are referenced later) do not necessarily show the accurate numbers of capacitor elements C that constitute the respective capacitors (41 to 44). Moreover, in these figures, all the capacitor elements C have the same shape, but capacitor elements C that have different shapes may be used. Although this will not be described in detail, it is possible to change the number of capacitor elements C that constitute the respective capacitors (41 to 44) (i.e., adjust the capacitance) by attaching or removing capacitor elements C.

Each of the capacitors (41 to 44) includes a pair of electrodes, namely a first electrode E1 and a second electrode E2. In the example shown in FIGS. 3 and 4, each of the capacitors (41 to 44) includes a plurality of capacitor elements C connected in parallel to each other. For this reason, the first electrode E1 of each of the capacitors (41 to 44) is formed by the set of first electrodes E1 of all the capacitor elements C, and the second electrode E2 of each of the capacitors (41 to 44) is formed by the set of second electrodes E2 of all the capacitor elements C.

In the present embodiment, the first adjusting unit 31 includes a first conductor 51, a second conductor 52, and a third conductor 53. Also, in the present embodiment, the second adjusting unit 32 includes a fourth conductor 54, a fifth conductor 55, and a sixth conductor 56. These six conductors (51 to 56) are arranged so as not to be in contact with each other. In the present embodiment, each of these conductors (51 to 56) is a plate-shaped conductor (bus bar). Also, in the present embodiment, the fourth conductor 54 has the same shape as the first conductor 51, the fifth conductor 55 has the same shape as the second conductor 52, the sixth conductor 56 has the same shape as the second conductor 52, and the sixth conductor 56 has the same shape as the third conductor 53.

In the example shown in FIGS. 3 and 4, these conductors (51 to 56) are housed in a case 2, which is a constituent element of the power supply device 1. Specifically, the inside of the case 2 has a rectangular shape in plan view (specifically, shaped as a rectangle having two long sides extending in a first direction X and two short sides extending in a second direction Y), and the conductors (51 to 56) are arranged so as to extend in the first direction X. In the example shown in FIGS. 3 and 4, the three conductors (51 to 53) that constitute the first adjusting unit 31 are arranged at different positions, with respect to the second direction Y, from the three conductors (54 to 56) that constitute the second adjusting unit 32. Accordingly, the second direction Y is a direction orthogonal to the direction in which the conductors (51 to 56) extend, and is also the direction in which the first adjusting units 31 and the second adjusting units 32 are arranged side by side.

The first conductor 51 is connected to the first electrode E1 of the first capacitor 41 and the first electrode E1 of the second capacitor 42. The second conductor 52 is connected to the second electrode E2 of the first capacitor 41. The third conductor 53 is connected to the second electrode E2 of the second capacitor 42 and a non-switched connection section (in the present embodiment, the output unit 20, or more specifically the first output terminal 21). Note that in this specification, either the power supply unit 10 or the output unit 20 is defined as a switched connection section, and the other one is defined as a non-switched connection section. In the present embodiment, the power supply unit 10 is the switched connection section and the output unit 20 is the non-switched connection section.

In the example shown in FIGS. 3 and 4, the second conductor 52 faces the first conductor 51 in the second direction Y. The first capacitor 41 is arranged such that the first electrode E1 of the first capacitor 41 is connected to the first conductor 51, and such that the second electrode E2 of the first capacitor 41 is connected to the second conductor 52. Also, in the example shown in FIGS. 3 and 4, the third conductor 53 faces the first conductor 51 in the second direction Y. The second capacitor 42 is arranged such that the first electrode E1 of the second capacitor 42 is connected to the first conductor 51, and such that the second electrode E2 of the second capacitor 42 is connected to the third conductor 53. In the example shown in FIGS. 3 and 4, the second conductor 52 and the third conductor 53 are arranged side by side in the first direction X at the same position in the second direction Y.

The fourth conductor 54 is connected to the first electrode E1 of the third capacitor 43 and the first electrode E1 of the fourth capacitor 44. The fifth conductor 55 is connected to the second electrode E2 of the third capacitor 43. The sixth conductor 56 is connected to the second electrode E2 of the fourth capacitor 44 and the non-switched connection section (in the present embodiment, the output unit 20, or more specifically the second output terminal 22).

In the example shown in FIGS. 3 and 4, the fifth conductor 55 faces the fourth conductor 54 in the second direction Y. The third capacitor 43 is arranged such that the first electrode E1 of the third capacitor 43 is connected to the fourth conductor 54, and such that the second electrode E2 of the third capacitor 43 is connected to the fifth conductor 55. Also, in the example shown in FIGS. 3 and 4, the sixth conductor 56 faces the fourth conductor 54 in the second direction Y. The fourth capacitor 44 is arranged such that the first electrode E1 of the fourth capacitor 44 is connected to the fourth conductor 54, and such that the second electrode E2 of the fourth capacitor 44 is connected to the sixth conductor 56. In the example shown in FIGS. 3 and 4, the fifth conductor 55 and the sixth conductor 56 are arranged side by side in the first direction X at the same position in the second direction Y.

Here, "dual parallel connection state" refers to a state in which the first capacitor 41 and the second capacitor 42 are connected in parallel between the first power supply electrode 11 and the first output terminal 21, and furthermore the third capacitor 43 and the fourth capacitor 44 are connected in parallel between the second power supply electrode 12 and the second output terminal 22 (the state shown in FIG. 3). Also, "dual series connection state" refers to a state in which the first capacitor 41 and the second capacitor 42 are connected in series between the first power supply electrode 11 and the first output terminal 21, and furthermore the third capacitor 43 and the fourth capacitor 44 are connected in series between the second power supply electrode 12 and the second output terminal 22 (the state shown in FIG. 4). As will be described later, the circuit switching mechanism 4 can switch between the dual parallel connection state and the dual series connection state.

In the case where the power supply lines L are relatively short, by causing the circuit switching mechanism 4 to switch to the dual parallel connection state, it is possible to increase the combined capacitance of the first capacitor 41 and the second capacitor 42 and increase the combined capacitance of the third capacitor 43 and the fourth capacitor 44, thus increasing the capacitance of the power supply circuit 3. On the other hand, in the case where the power supply lines L are relatively long, by causing the circuit switching mechanism 4 to switch to the dual series connection state, it is possible to reduce the combined capacitance of the first capacitor 41 and the second capacitor 42 and reduce the combined capacitance of the third capacitor 43 and the fourth capacitor 44, thus reducing the capacitance of the power supply circuit 3.

In the dual series connection state, the terminal voltage (VC1) that increases as the capacitance of the first adjusting unit 31 (specifically, the combined capacitance of the first capacitor 41 and the second capacitor 42) decreases can be shared between the first capacitor 41 and the second capacitor 42, and the terminal voltage (VC2) that increases as the capacitance of the second adjusting unit 32 (specifically, the combined capacitance of the third capacitor 43 and the fourth capacitor 44) decreases can be shared between the third capacitor 43 and the fourth capacitor 44. Accordingly, compared to the case where the terminal voltage is not shared, it is possible to reduce the withstand voltage performance required for each of the capacitors (41 to 44) and reduce the cost.

Next, the configuration of the circuit switching mechanism 4 in the power supply device 1 of the present embodiment will be described. As shown in FIGS. 3 and 4, the circuit switching mechanism 4 includes a first short circuit conductor 61 and a first connection switching conductor 71. In the present embodiment, the circuit switching mechanism 4 further includes a second short circuit conductor 62 and a second connection switching conductor 72. In the present embodiment, the first short circuit conductor 61 corresponds to the "short circuit conductor", and the first connection switching conductor 71 corresponds to the "connection switching conductor".

The first short circuit conductor 61 is a conductor that can change between a first short circuit state of connecting the second conductor 52 and the third conductor 53 to each other (see FIG. 3), and a first separating state of separating the second conductor 52 and the third conductor 53 from each other (see FIG. 4). The first connection switching conductor 71 is a conductor that can change between a first connection state of connecting the switched connection section (in the present embodiment, the power supply unit 10, or more specifically the first power supply electrode 11) and the first conductor 51 to each other (see FIG. 3), and a second connection state of connecting the switched connection section (in the present embodiment, the power supply unit 10, or more specifically the first power supply electrode 11) and the second conductor 52 to each other (see FIG. 4).

The second short circuit conductor 62 is a conductor that can change between a second short circuit state of connecting the fifth conductor 55 and the sixth conductor 56 to each other (see FIG. 3), and a second separating state of separating the fifth conductor 55 and the sixth conductor 56 from each other (see FIG. 4). The second connection switching conductor 72 is a conductor that can change between a third connection state of connecting the switched connection section (in the present embodiment, the power supply unit 10, or more specifically the second power supply electrode 12) and the fourth conductor 54 to each other (see FIG. 3), and a fourth connection state of connecting the switched connection section (in the present embodiment, the power supply unit 10, or more specifically the second power supply electrode 12) and the fifth conductor 55 to each other (see FIG. 4). In the present embodiment, the second short circuit conductor 62 has the same shape as the first short circuit conductor 61, and the second connection switching conductor 72 has the same shape as the first connection switching conductor 71.

In the present embodiment, as shown in FIG. 3, the dual parallel connection state is realized when the first short circuit conductor 61 is in the first short circuit state, the second short circuit conductor 62 is in the second short circuit state, the first connection switching conductor 71 is in the first connection state, and the second connection switching conductor 72 is in the third connection state. Also, as shown in FIG. 4, the dual series connection state is realized when the first short circuit conductor 61 is in the first separating state, the second short circuit conductor 62 is in the second separating state, the first connection switching conductor 71 is in the second connection state, and the second connection switching conductor 72 is in the fourth connection state.

Figure 5:
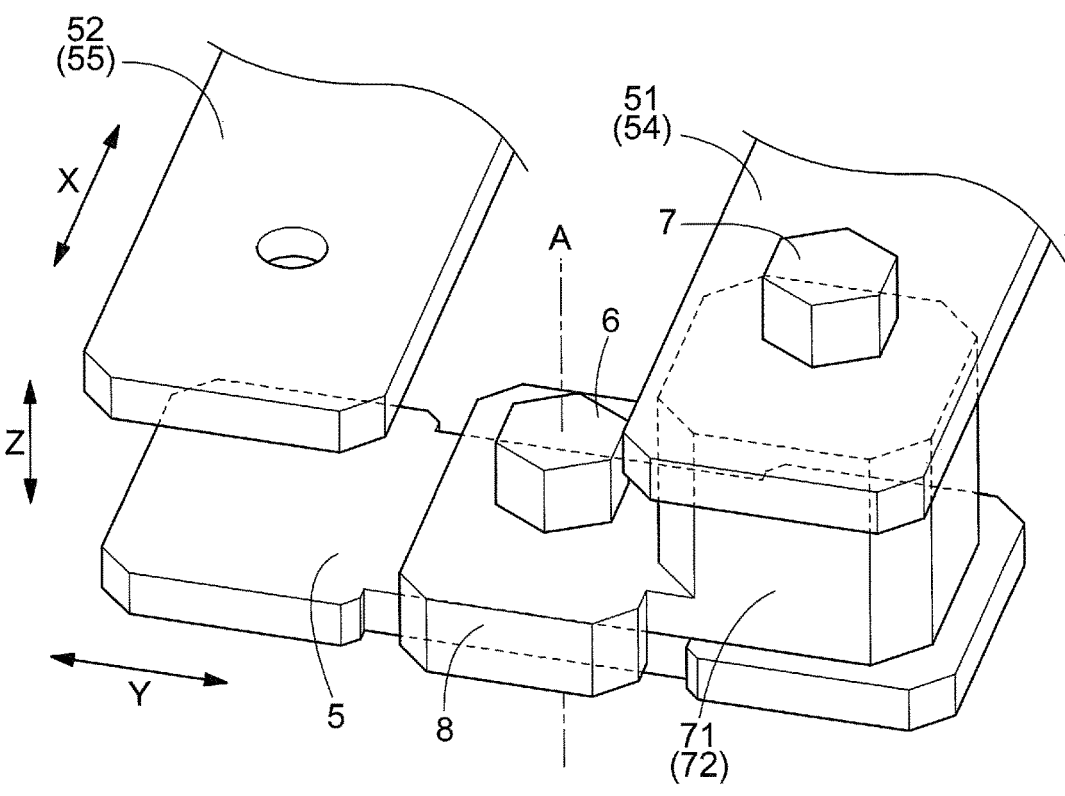
FIG. 5 is a perspective view of part of a circuit switching mechanism according to the first embodiment.
Figure 6:
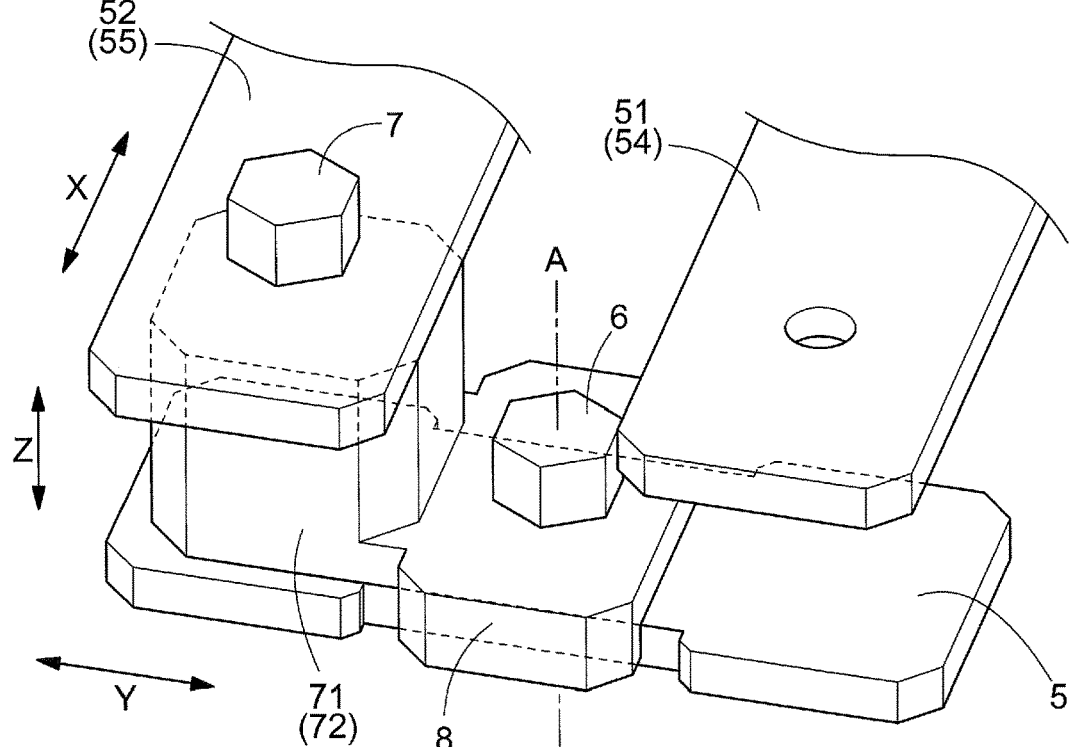
FIG. 6 is a perspective view of part of the circuit switching mechanism according to the first embodiment.

As shown in FIGS. 5 and 6, in the present embodiment, the circuit switching mechanism 4 includes a support section 5 that supports the first connection switching conductor 71 so as to be rotatable about a rotation axis A. Here, the rotation axis A is an axis (virtual axis) extending along a third direction Z orthogonal to both the first direction X and the second direction Y. In this example, a support bolt 6 is inserted through an insertion hole formed in the first connection switching conductor 71 and screwed to female threading formed in the support section 5. Also, the first connection switching conductor 71 is able to rotate about an axis extending along the shaft of the support bolt 6 (rotation axis A), while being restricted from moving toward both sides in the direction along the shaft of the support bolt 6 (third direction Z) by the support section 5 and the head of the support bolt 6. The first connection switching conductor 71 changes between the first connection state (see FIG. 5) and the second connection state (see FIG. 6) by rotating around the rotation axis A. By loosening the support bolt 6 (to the extent that the first connection switching conductor 71 is not removed from the support section 5) and rotating the first connection switching conductor 71, the first connection switching conductor 71 can be prevented from being removed. Note that a later-described fixing bolt 7 is removed before rotating the first connection switching conductor 71.

In the example shown in FIGS. 5 and 6, the support section 5 is a conductive member (here, a plate-shaped member). Although this will not be described in detail, the support section 5 is connected to the switched connection section (in the present embodiment, the power supply unit 10, or more specifically the first power supply electrode 11). Then, as shown in FIG. 5, if the first connection switching conductor 71 is rotated around the rotation axis A until the first connection switching conductor 71 (specifically, the contact portion arranged at a different position from the rotation axis A) comes into contact with the first conductor 51, the switched connection section and the first conductor 51 are connected to each other. In this example, the first connection switching conductor 71 and the support section 5 are fastened together and fixed by the support bolt 6, and the first connection switching conductor 71 and the first conductor 51 are fastened together and fixed by the fixing bolt 7, thus maintaining that state (first connection state). Also, as shown in FIG. 6, if the first connection switching conductor 71 is rotated around the rotation axis A until the first connection switching conductor 71 (specifically, the aforementioned contact portion) comes into contact with the second conductor 52, the switched connection section and the second conductor 52 are connected to each other. In this example, the first connection switching conductor 71 and the support section 5 are fastened together and fixed by the support bolt 6, and the first connection switching conductor 71 and the second conductor 52 are fastened together and fixed by the fixing bolt 7, thus maintaining that state (second connection state).

In this example, the portion of the first conductor 51 to which the first connection switching conductor 71 is fixed in the first connection state (see FIG. 5) and the portion of the second conductor 52 to which the first connection switching conductor 71 is fixed in the second connection state (see FIG. 6) are arranged at the same position in the first direction X and side by side in the second direction Y on opposite sides of the rotation axis A. Also, the first connection switching conductor 71 changes between the first connection state and the second connection state by rotating 180 degrees around the rotation axis A. Also, in this example, in order to facilitate the task of changing between the first connection state and the second connection state, the first connection switching conductor 71 is provided with a rotation stopper for restricting rotation around the rotation axis A relative to the support section 5. The rotation stopper restricts rotation of the first connection switching conductor 71 from the rotational position for realizing the first connection state (see FIG. 5), and restricts rotation of the first connection switching conductor 71 from the rotational position for realizing the second connection state (see FIG. 6). Various structures can be adopted for the rotation stopper, but in the example shown in FIGS. 5 and 6, the rotation stopper for restricting rotation of the first connection switching conductor 71 is realized by providing the first connection switching conductor 71 with a pair of engaging sections 8 that engage with side faces of the support section 5, and sandwiching (here, from the two sides in the first direction X) the support section 5 with the pair of engaging sections 8.

In the present embodiment, the second connection switching conductor 72 is also configured to change between states by rotating, similarly to the first connection switching conductor 71. Due to having a configuration similar to that of the first connection switching conductor 71, corresponding reference signs are placed in parentheses in FIGS. 5 and 6 in order to omit a detailed description, and the second connection switching conductor 72 changes between a third connection state (see FIG. 5) and a fourth connection state (see FIG. 6) by rotating around the rotation axis A. Note that the rotation axis A here is an axis parallel to the above-described rotation axis A of the first connection switching conductor 71.

In the present embodiment, the first short circuit conductor 61 is configured to be detached and attached when changing the state of the first short circuit conductor 61, and the second short circuit conductor 62 is configured to be detached and attached when changing the state of the second short circuit conductor 62. Specifically, the first short circuit conductor 61 is detachably attached to the second conductor 52 and the third conductor 53. Also, the first short circuit state (see FIG. 3) is realized by fixing (in this example, fastening and fixing with use of a bolt) the first short circuit conductor 61 to the second conductor 52 and the third conductor 53 so as to be in contact with both the second conductor 52 and the third conductor 53, and the first separating state (see FIG. 4) is realized by detaching the first short circuit conductor 61 from the second conductor 52 and the third conductor 53. Similarly, the second short circuit conductor 62 is detachably attached to the fifth conductor 55 and the sixth conductor 56. Also, the second short circuit state (see FIG. 3) is realized by fixing (in this example, fastening and fixing with use of a bolt) the second short circuit conductor 62 to the fifth conductor 55 and the sixth conductor 56 so as to be in contact with both the fifth conductor 55 and the sixth conductor 56, and the second separating state (see FIG. 4) is realized by detaching the second short circuit conductor 62 from the fifth conductor 55 and the sixth conductor 56.

In this example, the two conductors connected by the short circuit conductor (61, 62) are arranged such that the portions to which the short circuit conductor (61, 62) is fixed are side by side in the first direction X at the same position in the second direction Y. Also, the short circuit conductor (61, 62) extends in the first direction X and connects the two conductors.

In the present embodiment, corresponding markings are provided on the first short circuit conductor 61 and the location where the first connection switching conductor 71 needs to be arranged in order to realize the first connection state. Similarly, corresponding markings are provided on the second short circuit conductor 62 and the location where the second connection switching conductor 72 needs to be arranged in order to realize the third connection state. Here, a "marking" is an insignia or a character used as an indicator, for example, and is a concept that includes an emblem, a mark, and a symbol mark, for example. Also, "corresponding markings" is a concept including not only markings that are identical or congruent with each other, but also markings that are different from each other but clearly correspond to each other, such as "short circuit 1" and "short circuit 2".

In the example shown in FIGS. 3 and 4, a first marking M1 is provided at the location where the first connection switching conductor 71 needs to be arranged in order to realize the first connection state and the location where the second connection switching conductor 72 needs to be arranged in order to realize the third connection state. Also, a second marking M2 that does not correspond to the first marking M1 is provided at the location where the first connection switching conductor 71 needs to be arranged in order to realize the second connection state and the location where the second connection switching conductor 72 needs to be arranged in order to realize the fourth connection state. Also, a third marking M3 corresponding to the first marking M1 is provided on the first short circuit conductor 61 and the second short circuit conductor 62. For example, the first marking M1 and the third marking M3 are marks that have the same color (e.g., blue), and the second marking M2 is a mark that has a different color from the first marking M1 and the third marking M3 (e.g., red). Note that a configuration is possible in which the second marking M2 is not provided.

Second Embodiment

A second embodiment of the power supply device will be described below with reference to the drawings. The following description of the power supply device of the present embodiment focuses mainly on differences from the first embodiment. Points that are not particularly specified are similar to those in the first embodiment, and the same reference numerals are used in order to omit detailed descriptions.

Figures 7, 8:
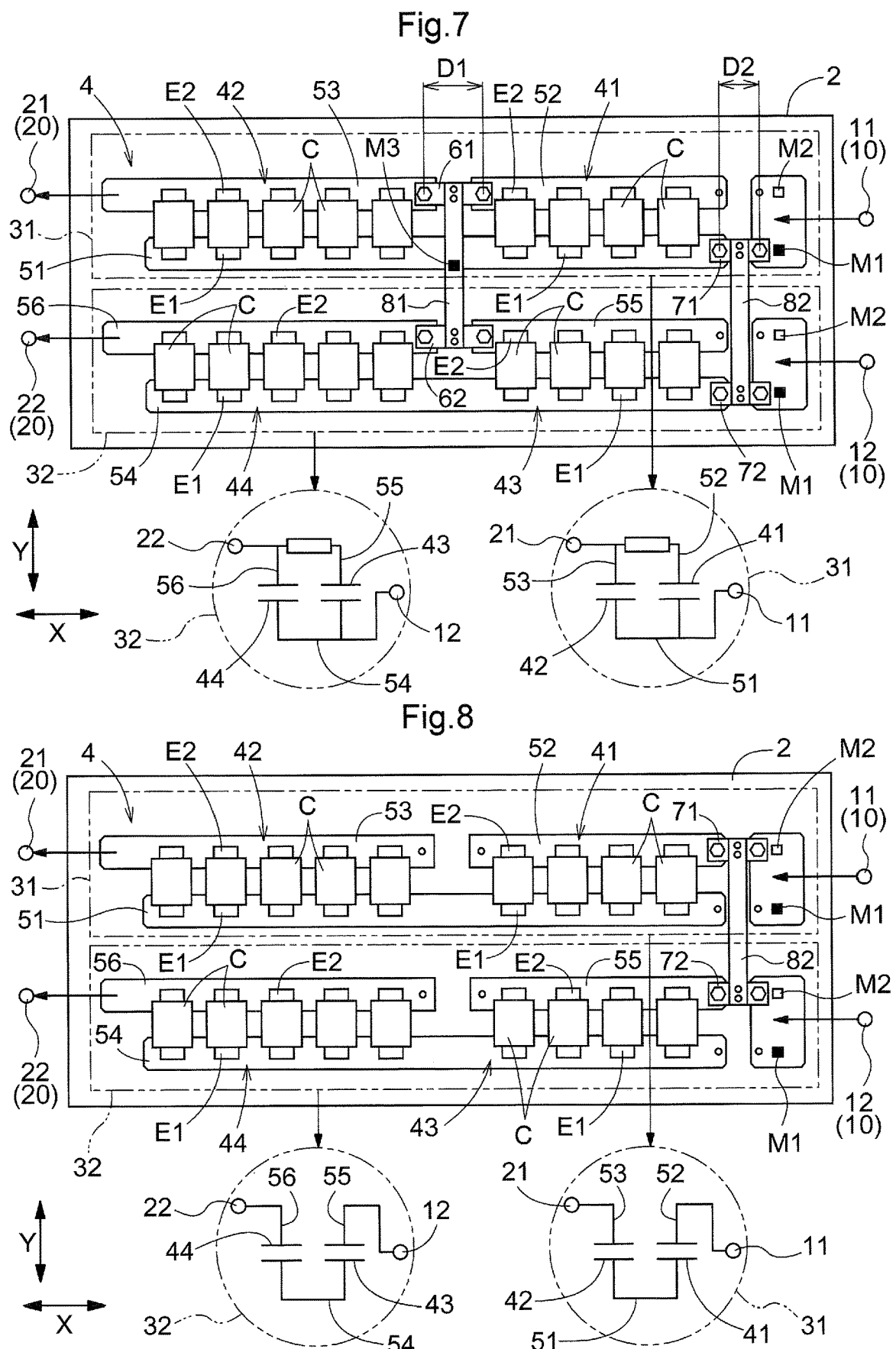
FIG. 7 is a plan view of a first adjusting unit and a second adjusting unit according to a second embodiment.
FIG. 8 is a plan view of the first adjusting unit and the second adjusting unit according to the second embodiment.

As shown in FIGS. 7 and 8, in the present embodiment, unlike the first embodiment, the first connection switching conductor 71 is detached and attached when changing the state of the first connection switching conductor 71, and the second connection switching conductor 72 is detached and attached when changing the state of the second connection switching conductor 72. Note that in the example shown in FIGS. 3 and 4, the power supply unit 10 is arranged on the left side (in the figure) of the output unit 20, whereas in the example shown in FIGS. 7 and 8, the power supply unit 10 is arranged on the right side (in the figure) of the output unit 20.

In the present embodiment, as shown in FIG. 7, the distance between the second conductor 52 and the third conductor 53 that are connected by the first short circuit conductor 61 is different from the distance between the switched connection section (in the present embodiment, the power supply unit 10, or more specifically the first power supply electrode 11) and the first conductor 51 that are connected by the first connection switching conductor 71. Also, the distance between the switched connection section (in the present embodiment, the power supply unit 10, or more specifically the first power supply electrode 11) and the first conductor 51 that are connected by the first connection switching conductor 71 is the same as the distance between the switched connection section (in the present embodiment, the power supply unit 10, or more specifically the first power supply electrode 11) and the second conductor 52 that are connected by the first connection switching conductor 71. Note that in the present embodiment, the switched connection section also includes the conductors that are connected to the power supply unit 10 (here, the first power supply electrode 11), which are the plate-shaped conductors provided with the first marking M1 and the second marking M2 in the example shown in FIGS. 7 and 8.

Similarly, in the present embodiment, the distance between the fifth conductor 55 and the sixth conductor 56 that are connected by the second short circuit conductor 62 is different from the distance between the switched connection section (in the present embodiment, the power supply unit 10, or more specifically the second power supply electrode 12) and the fourth conductor 54 that are connected by the second connection switching conductor 72. Also, the distance between the switched connection section (in the present embodiment, the power supply unit 10, or more specifically the second power supply electrode 12) and the fourth conductor 54 that are connected by the second connection switching conductor 72 is the same as the distance between the switched connection section (in the present embodiment, the power supply unit 10, or more specifically the second power supply electrode 12) and the fifth conductor 55 that are connected by the second connection switching conductor 72. Note that in the present embodiment, the switched connection section also includes the conductors that are connected to the power supply unit 10 (here, the second power supply electrode 12), which are the plate-shaped conductors provided with the first marking M1 and the second marking M2 in the example shown in FIGS. 7 and 8.

In the example shown in FIG. 7, the distance between the second conductor 52 and the third conductor 53 that are connected by the first short circuit conductor 61 is the same as the distance between the fifth conductor 55 and the sixth conductor 56 that are connected by the second short circuit conductor 62, and this distance is defined as a first distance D1. In this example, the two conductors connected by the short circuit conductor (61, 62) are arranged such that the fixed portions to which the short circuit conductor (61, 62) is fixed are side by side in the first direction X at the same position in the second direction Y, and the first distance D1 is the distance (in the first direction X) between the fixed portions of the two conductors. In this example, hole portions for the insertion or fastening of bolts are formed in the fixed portions (see FIG. 8), and the first distance D1 is the distance between the hole portions formed in the two conductors.

Also, in the example shown in FIG. 7, the distance between the switched connection section and the first conductor 51 that are connected by the first connection switching conductor 71, the distance between the switched connection section and the second conductor 52 that are connected by the first connection switching conductor 71, the distance between the switched connection section and the fourth conductor 54 that are connected by the second connection switching conductor 72, and the distance between the switched connection section and the fifth conductor 55 that are connected by the second connection switching conductor 72 are all the same distance, and this distance is a second distance D2. In this example, the two conductors connected by the connection switching conductor (71, 72) are arranged such that the fixed portions to which the connection switching conductor (71, 72) is fixed are side by side in the first direction X at the same position in the second direction Y, and the second distance D2 is the distance (in the first direction X) between the fixed portions of the two conductors. In this example, hole portions for the insertion or fastening of bolts are formed in the fixed portions (see FIG. 8, FIG. 9), and the second distance D2 is the distance between the hole portions formed in the two conductors. Note that in this example, the second distance D2 is smaller than the first distance D1, but the second distance D2 may be larger than the first distance D1.

In the present embodiment, the circuit switching mechanism 4 includes a non-conductive first coupling member 81 that couples the first short circuit conductor 61 and the second short circuit conductor 62, and a non-conductive second coupling member 82 that couples the first connection switching conductor 71 and the second connection switching conductor 72. In the example shown in FIGS. 7 and 8, the first short circuit conductor 61 and the second short circuit conductor 62 for realizing the dual parallel connection state (see FIG. 7) are arranged at the same position in the first direction X. The first coupling member 81 extends in the second direction Y and couples the first short circuit conductor 61 and the second short circuit conductor 62. Although this will not be described in detail, in the first embodiment, the circuit switching mechanism 4 may include the first coupling member 81.

Also, in the example shown in FIGS. 7 and 8, the first connection switching conductor 71 and the second connection switching conductor 72 for realizing the dual parallel connection state (see FIG. 7) are arranged at the same position in the first direction X. Moreover, the first connection switching conductor 71 and the second connection switching conductor 72 for realizing the dual series connection state (see FIG. 8) are arranged at the same position in the first direction X. Furthermore, the distance in the second direction Y between the locations of the first connection switching conductor 71 and the second connection switching conductor 72 for realizing the dual parallel connection state (see FIG. 7) is the same as the distance in the second direction Y between the locations of the first connection switching conductor 71 and the second connection switching conductor 72 for realizing the dual series connection state (see FIG. 8). The second coupling member 82 extends in the second direction Y and couples the first connection switching conductor 71 and the second connection switching conductor 72.

Other Embodiments (1) In the second embodiment, an example is described in which the distance between the second conductor 52 and the third conductor 53 that are connected by the first short circuit conductor 61 is different from the distance between the switched connection section and the first conductor 51 that are connected by the first connection switching conductor 71. However, the present disclosure is not limited to this configuration, and these two distances may be the same. Also, in the second embodiment, an example is described in which the distance between the fifth conductor 55 and the sixth conductor 56 that are connected by the second short circuit conductor 62 is different from the distance between the switched connection section and the fourth conductor 54 that are connected by the second connection switching conductor 72. However, the present disclosure is not limited to this configuration, and these two distances may be the same.

(2) In the above-described second embodiment, an example is described in which the circuit switching mechanism 4 includes the first coupling member 81 and the second coupling member 82. However, the present disclosure is not limited to this configuration, and a configuration is also possible in which the circuit switching mechanism 4 does not include either the first coupling member 81 or the second coupling member 82 or both of them.

(3) In the above-described embodiments, an example is described in which corresponding markings are provided on the first short circuit conductor 61 and the location where the first connection switching conductor 71 needs to be arranged in order to realize the first connection state. However, the present disclosure is not limited to this configuration, and a configuration is possible in which such markings are not provided. Also, in the above-described embodiments, an example is described in which corresponding markings are provided on the second short circuit conductor 62 and the location where the second connection switching conductor 72 needs to be arranged in order to realize the third connection state. However, the present disclosure is not limited to this configuration, and a configuration is possible in which such markings are not provided.

(4) In the above-described embodiments, an example is described in which the first short circuit conductor 61 is configured to be detached and attached when changing the state of the first short circuit conductor 61, and the second short circuit conductor 62 is configured to be detached and attached when changing the state of the second short circuit conductor 62. However, the present disclosure is not limited to this configuration, and a configuration is also possible in which the state of the first short circuit conductor 61 is changed by rotating the first short circuit conductor 61, and the state of the second short circuit conductor 62 is changed by rotating the second short circuit conductor 62, as with the first connection switching conductor 71 and the second connection switching conductor 72 in the first embodiment.

(5) In the above-described embodiments, an example is described in which the power supply unit 10 is a switched connection section and the output unit 20 is a non-switched connection section. However, the present disclosure is not limited to this configuration, and a configuration is also possible in which the output unit 20 is a switched connection section and the power supply unit 10 is a non-switched connection section. For example, in the example shown in FIGS. 3 and 4, in the case where the output unit 20 is the switched connection section and the power supply unit 10 is the non-switched connection section, then the first power supply electrode 11, the second power supply electrode 12, the first output terminal 21, and the second output terminal 22 in FIGS. 3 and 4 are respectively replaced with the first output terminal 21, the second output terminal 22, the first power supply electrode 11, and the second power supply electrode 12. This similarly applies to the example shown in FIGS. 7 and 8.

(6) In the above-described embodiments, an example is described in which the first adjusting unit 31 is connected between the first power supply electrode 11 and the first output terminal 21, and the second adjusting unit 32 is connected between the second power supply electrode 12 and the second output terminal 22. However, the present disclosure is not limited to this configuration, and as other examples, the first adjusting unit 31 and the second adjusting unit 32 may be connected in series between the first power supply electrode 11 and the first output terminal 21, or the first adjusting unit 31 and the second adjusting unit 32 may be connected in series between the second power supply electrode 12 and the second output terminal 22. In the case where the adjusting units (31, 32) are not provided between the second power supply electrode 12 and the second output terminal 22, the second power supply electrode 12 and the second output terminal 22 are directly connected to each other (i.e., without a circuit element therebetween), for example. Also, in the case where the adjusting units (31, 32) are not provided between the first power supply electrode 11 and the first output terminal 21, the first power supply electrode 11 and the first output terminal 21 are directly connected to each other, for example.

(7) In the above-described embodiments, an example is described in which the power supply device 1 includes the second adjusting unit 32. However, the present disclosure is not limited to this configuration, and a configuration is also possible in which the power supply device 1 does not include the second adjusting unit 32. In this case, the first adjusting unit 31 is connected between the first power supply electrode 11 and the first output terminal 21 or between the second power supply electrode 12 and the second output terminal 22.

(8) Note that the configurations disclosed in each of the above-described embodiments may be applied in combination with configurations disclosed in other embodiments (including combinations between embodiments described as other embodiments) as long as no contradiction arises. Regarding other configurations as well, the embodiments disclosed in this specification are merely examples in all respects. Accordingly, various modifications can be made as appropriate without departing from the scope of the present disclosure.

Overview of Embodiments

The following describes an overview of the power supply device described above.

A power supply device according to an aspect of the present disclosure is a power supply device for use in a contactless power supply facility, the power supply device being connectable to a power supply line extending along a movement path of a moving body provided with a power receiving device, and being configured to supply power to the power receiving device in a contactless manner by supplying alternating current to the power supply line, the power supply device including: a power supply unit configured to output alternating current; an output unit configured to be connected to the power supply line; and an adjusting unit configured to adjust a capacitance of a power supply circuit between the power supply unit and the output unit, wherein the adjusting unit includes a first capacitor, a second capacitor, and a circuit switching mechanism, and the circuit switching mechanism is switchable between a series connection state, in which the first capacitor and the second capacitor are connected in series between the power supply unit and the output unit, and a parallel connection state, in which the first capacitor and the second capacitor are connected in parallel between the power supply unit and the output unit.

According to this configuration, in the case where the power supply line is relatively long, by causing the circuit switching mechanism to switch to the series connection state, it is possible to reduce the combined capacitance of the first capacitor and the second capacitor, thus reducing the capacitance of the power supply circuit. On the other hand, in the case where the power supply line is relatively short, by causing the circuit switching mechanism to switch to the parallel connection state, it is possible to increase the combined capacitance of the first capacitor and the second capacitor, thus increasing the capacitance of the power supply circuit.

Thus, according to the above configuration, it is possible to appropriately adjust the capacitance of the power supply circuit in accordance with the length of the power supply line. Moreover, according to the above configuration, in the case where the power supply line is relatively long, the circuit switching mechanism can be switched to the series connection state, thus making it possible for the terminal voltage, which increases due to a decrease in the capacitance of the power supply circuit, to be shared between the first capacitor and the second capacitor. Accordingly, compared to the case where the terminal voltage is not shared, it is possible to reduce the withstand voltage performance required for the first capacitor and the second capacitor and achieve a reduction in cost.

Thus, according to this configuration, it is possible to appropriately adjust the capacitance of the power supply circuit in accordance with the length of the power supply line, while also achieving a reduction in cost.

Here, it is preferable that with a switched connection section and a non-switched connection section respectively being (i) the power supply unit and the output unit or (ii) the output unit and the power supply unit, the adjusting unit further includes: a first conductor connected to a first electrode of the first capacitor and a first electrode of the second capacitor; a second conductor connected to a second electrode of the first capacitor; and a third conductor connected to a second electrode of the second capacitor and the non-switched connection section, the circuit switching mechanism includes a short circuit conductor and a connection switching conductor, the short circuit conductor is changeable between (i) a state in which the short circuit conductor connects the second conductor and the third conductor and (ii) a state in which the short circuit conductor separates the second conductor and the third conductor, and the connection switching conductor is changeable between (i) a first connection state in which the connection switching conductor connects the switched connection section and the first conductor and (ii) a second connection state in which the connection switching conductor connects the switched connection section and the second conductor.

According to this configuration, by setting the short circuit conductor to the state of separating the second conductor and the third conductor, and setting the connection switching conductor to the second connection state, it is possible to realize the series connection state in which the first capacitor and the second capacitor are connected to each other in series between the power supply unit and the output unit. Also, by setting the short circuit conductor to the state of connecting the second conductor and the third conductor, and setting the connection switching conductor to the first connection state, it is possible to realize the parallel connection state in which the first capacitor and the second capacitor are connected to each other in parallel between the power supply unit and the output unit. Accordingly, switching between the series connection state and the parallel connection state by the circuit switching mechanism can be performed relatively easily.

In the above configuration, it is preferable that the circuit switching mechanism further includes a support section configured to support the circuit switching mechanism in such a manner that the connection switching conductor is rotatable around a rotation axis, and the connection switching conductor changes between the first connection state and the second connection state by rotating around the rotation axis.

According to this configuration, the state of the connection switching conductor can be changed between the first connection state and the second connection state by the relatively easy operation of rotating the connection switching conductor. Also, compared to a configuration in which the state of the connection switching conductor is changed by detaching and attaching the connection switching conductor, it is possible to suppress cases of making a mistake when connecting the connection switching conductor, and cases of losing the connection switching conductor.

Also, it is preferable that the second conductor and the third conductor connectable by the short circuit conductor are apart by a separation distance different from a separation distance between the switched connection section and the first conductor connectable by the connection switching conductor, and the switched connection section and the first conductor connectable by the connection switching conductor are apart by a separation distance corresponding to a separation distance between the switched connection section and the second conductor connectable by the connection switching conductor.

According to this configuration, even if both the short circuit conductor and the connection switching conductor are detachable, it is possible to avoid the case where the short circuit conductor and the connection switching conductor are mistakenly switched with each other.

Also, it is preferable that the power supply unit includes a first power supply electrode and a second power supply electrode, the output unit includes a first output terminal and a second output terminal, with a first adjusting unit being the adjusting unit, a first short circuit conductor being the short circuit conductor, and a first connection switching conductor being the connection switching conductor, the first adjusting unit is connected between the first power supply electrode and the first output terminal, the power supply device further includes a second adjusting unit connected between the second power supply electrode and the second output terminal, the second adjusting unit includes: a third capacitor; a fourth capacitor; a fourth conductor connected to a first electrode of the third capacitor and a first electrode of the fourth capacitor; a fifth conductor connected to a second electrode of the third capacitor; and a sixth conductor connected to a second electrode of the fourth capacitor and the non-switched connection section, the circuit switching mechanism further includes a second short circuit conductor and a second connection switching conductor, the second short circuit conductor is changeable between (i) a state in which the second short circuit conductor connects the fifth conductor and the sixth conductor and (ii) a state in which the second short circuit conductor separates the fifth conductor and the sixth conductor, and the second connection switching conductor is changeable between (i) a state in which the second connection switching conductor connects the switched connection section and the fourth conductor and (ii) a state in which the second connection switching conductor connects the switched connection section and the fifth conductor.

According to this configuration, by setting the first short circuit conductor to the state of separating the second conductor and the third conductor, setting the second short circuit conductor to the state of separating the fifth conductor and the sixth conductor, setting the first connection switching conductor to the second connection state, and setting the second connection switching conductor to the state of connecting the switched connection section and the fifth conductor, it is possible to realize the dual series connection state in which the first capacitor and the second capacitor are connected to each other in series between the first power supply electrode and the first output terminal, and furthermore the third capacitor and the fourth capacitor are connected to each other in series between the second power supply electrode and the second output terminal. If the power supply line is relatively long, the capacitance of the power supply circuit can be reduced by switching to the dual series connection state with use of the circuit switching mechanism. Also, by setting the first short circuit conductor to the state of connecting the second conductor and the third conductor, setting the second short circuit conductor to the state of connecting the fifth conductor and the sixth conductor, setting the first connection switching conductor to the first connection state, and setting the second connection switching conductor to the state of connecting the switched connection section and the fourth conductor, it is possible to realize the dual parallel connection state in which the first capacitor and the second capacitor are connected to each other in parallel between the first power supply electrode and the first output terminal, and furthermore the third capacitor and the fourth capacitor are connected to each other in parallel between the second power supply electrode and the second output terminal. If the power supply line is relatively short, the capacitance of the power supply circuit can be increased by switching to the dual parallel connection state with use of the circuit switching mechanism.

Also, according to the above configuration, the first adjusting unit and the second adjusting unit are separately connected to the two electrodes of the power supply unit, and therefore the potential difference (maximum potential difference, maximum voltage) in the path including the power supply circuit and the power supply line can be kept smaller than in the case where both the first adjusting unit and the second adjusting unit are connected to one electrode of the power supply unit. This potential difference, which increases as the power supply line becomes longer, needs to be kept within a range in which the withstand voltage performances of the units are satisfied, and according to the above configuration, the potential difference can be kept small, thus making it easier to increase the length of the power supply line.

In the above configuration, it is preferable that the circuit switching mechanism further includes: a non-conductive first coupling member configured to couple the first short circuit conductor and the second short circuit conductor; and a non-conductive second coupling member configured to couple the first connection switching conductor and the second connection switching conductor.

According to this configuration, it is possible to avoid the case where the first short circuit conductor and the second short circuit conductor are in different states, that is to say one being in the state for realizing the series connection state and the other being in the state for realizing the parallel connection state. Similarly, it is possible to avoid the case where the first connection switching conductor and the second connection switching conductor are in different states, that is to say one being in the state for realizing the series connection state and the other being in the state for realizing the parallel connection state. Accordingly, it is easy to appropriately realize the dual series connection state and the dual parallel connection state described above.

Also, it is preferable that corresponding markings are provided on the short circuit conductor and a location where the connection switching conductor is to be arranged in order to realize the first connection state.

According to this configuration, the operator who operates the circuit switching mechanism can easily understand that when setting the short circuit conductor to the short circuit state, the connection switching conductor needs to be set to the first connection state. Therefore, it is possible to make it unlikely for a mistake to occur when switching between the series connection state and the parallel connection state.

The power supply device according to the present disclosure need only achieve at least one of the effects described above.

What is claimed is:

1. A power supply device for use in a contactless power supply facility, the power supply device connectable to a power supply line extending along a movement path of a moving body provided with a power receiving device, and configured to supply power to the power receiving device in a contactless manner by supplying alternating current to the power supply line, the power supply device comprising:

a power supply unit configured to output alternating current;

an output unit configured to connect to the power supply line; and an adjusting unit configured to adjust a capacitance of a power supply circuit between the power supply unit and the output unit, wherein the adjusting unit comprises:

a first capacitor, a second capacitor, and a circuit switching mechanism, and wherein the circuit switching mechanism is switchable between a series connection state, in which the first capacitor and the second capacitor are connected in series between the power supply unit and the output unit, and a parallel connection state, in which the first capacitor and the second capacitor are connected in parallel between the power supply unit and the output unit.

2. The power supply device according to claim 1, wherein:

with a switched connection section and a non-switched connection section respectively being (i) the power supply unit and the output unit or (ii) the output unit and the power supply unit, the adjusting unit further comprises:

a first conductor connected to a first electrode of the first capacitor and a first electrode of the second capacitor;

a second conductor connected to a second electrode of the first capacitor; and a third conductor connected to a second electrode of the second capacitor and the non-switched connection section, the circuit switching mechanism comprises:

a short circuit conductor; and a connection switching conductor, the short circuit conductor is changeable between (i) a state in which the short circuit conductor connects the second conductor and the third conductor and (ii) a state in which the short circuit conductor separates the second conductor and the third conductor, and the connection switching conductor is changeable between (i) a first connection state in which the connection switching conductor connects the switched connection section and the first conductor and (ii) a second connection state in which the connection switching conductor connects the switched connection section and the second conductor.

3. The power supply device according to claim 2, wherein the circuit switching mechanism further comprises a support section configured to support the circuit switching mechanism in such a manner that the connection switching conductor is rotatable around a rotation axis, and wherein the connection switching conductor changes between the first connection state and the second connection state by rotating around the rotation axis.

4. The power supply device according to claim 2, wherein the second conductor and the third conductor connectable by the short circuit conductor are apart by a separation distance different from a separation distance between the switched connection section and the first conductor connectable by the connection switching conductor, and wherein the switched connection section and the first conductor connectable by the connection switching conductor are apart by a separation distance corresponding to a separation distance between the switched connection section and the second conductor connectable by the connection switching conductor.

5. The power supply device according to claim 2, wherein:

the power supply unit comprises:

a first power supply electrode; and a second power supply electrode, the output unit comprises:

a first output terminal; and a second output terminal, with a first adjusting unit being the adjusting unit, a first short circuit conductor being the short circuit conductor, and a first connection switching conductor being the connection switching conductor, the first adjusting unit is connected between the first power supply electrode and the first output terminal, the power supply device further comprises a second adjusting unit connected between the second power supply electrode and the second output terminal, the second adjusting unit comprises:

a third capacitor;

a fourth capacitor;

a fourth conductor connected to a first electrode of the third capacitor and a first electrode of the fourth capacitor;

a fifth conductor connected to a second electrode of the third capacitor; and a sixth conductor connected to a second electrode of the fourth capacitor and the non-switched connection section, the circuit switching mechanism further comprises:

a second short circuit conductor; and a second connection switching conductor, the second short circuit conductor is changeable between (i) a state in which the second short circuit conductor connects the fifth conductor and the sixth conductor and (ii) a state in which the second short circuit conductor separates the fifth conductor and the sixth conductor, and the second connection switching conductor is changeable between (i) a state in which the second connection switching conductor connects the switched connection section and the fourth conductor and (ii) a state in which the second connection switching conductor connects the switched connection section and the fifth conductor.

6. The power supply device according to claim 5, wherein the circuit switching mechanism further comprises:

a non-conductive first coupling member configured to couple the first short circuit conductor and the second short circuit conductor; and a non-conductive second coupling member configured to couple the first connection switching conductor and the second connection switching conductor.

7. The power supply device according to claim 2, wherein corresponding markings are provided on the short circuit conductor and a location where the connection switching conductor is to be arranged in order to realize the first connection state.

* * * * *